United States Patent [19]

Orain

[11] Patent Number: 4,610,327

[45] Date of Patent: Sep. 9, 1986

[54] DOUBLE-JOINT TRANSMISSION DEVICE IN PARTICULAR FOR A VEHICLE

[75] Inventor: Michel A. Orain, Conflans Ste Honorine, France

[73] Assignee: Glaenzer Spicer, Poissy, France

[21] Appl. No.: 636,249

[22] Filed: Jul. 31, 1984

[30] Foreign Application Priority Data

Aug. 2, 1983 [FR] France ............................. 83 12726

[51] Int. Cl.$^4$ ........................................... B60K 20/00
[52] U.S. Cl. ...................................... 180/73.1; 180/85
[58] Field of Search ...................... 180/73.1, 75.2, 85

[56] References Cited

U.S. PATENT DOCUMENTS 1,445,125  2/1923  Batenburg .......................... 180/75.2
2,381,399  8/1945  Brown ................................... 180/85
3,419,102  12/1968  Sampietro .......................... 180/73.1

FOREIGN PATENT DOCUMENTS 2416811  9/1979  France .
2469311  5/1981  France .
507497   6/1939  United Kingdom ............... 180/73.1

Primary Examiner—John J. Love
Assistant Examiner—Ross Weaver
Attorney, Agent, or Firm—Wenderoth, Lind & Ponack

[57] ABSTRACT

A driving or driven element 7 to which the double joint 20 is connected and which may undergo movements modifying the operating angle of the joint, is connected to a fixed part 12 of the vehicle through a resiliently yieldable articulation 22 which is roughly centered on the centre of the double joint and has a high tangential flexibility and a high axial rigidity. In this way there is achieved an equal division of the variation in the operating angle between the two articulations of the double joint and consequently optimum operating conditions.

11 Claims, 4 Drawing Figures

DOUBLE-JOINT TRANSMISSION DEVICE IN PARTICULAR FOR A VEHICLE

The present invention relates to transmission devices employed in particular in vehicles, of the type comprising a double joint including two adjacent articulations interconnected by a common intermediate element, said double joint being disposed between a driving element and a driven element and allowing a relative radial displacement between the driving and driven elements.

Such a transmission device is designed to achieve the dynamic interruption of the radial vibrations and to avoid the transmission of these vibrations to the transmission shafts and to the rigid controls connected through this joint to the motor and in particular to an explosion motor.

When this dynamic interruption condition concerning the vibrations is satisfied, the radial vibrations are prevented from propagating through the transmission shafts and the rigid controls to the chassis and the passenger compartment or body, and the comfort of the vehicle is in this way substantially improved.

The articulations used in such a double joint may be formed by resiliently yieldable articulations employing an elastomer or flexible metal elements or by mechanical articulations such as tripod joints provided with rollers mounted on needles.

The articulations of the first category have a low friction but on the other hand limited performances as concerns capacity, durability or operating at an angle.

On the other hand, the tripod joints whose rollers are mounted on needles have very low frictions but may have the drawback, when the operating angle increases, of producing an orbital motion whose amplitude is proportional to the square of this angle. This drawback may become noticeable for high speeds of rotation, for example exceeding 2 500 rpm.

An object of the invention is to improve such a double-joint transmission device so as to render it less sensitive to variations in the operating angle and to ensure that a variation in this angle will be divided evenly between the two articulations constituting the joint.

The invention therefore provides a transmission device comprising a double transmission joint having two articulations interconnected by a common intermediate element, said joint being disposed between a driving element and a driven element and allowing a relative radial displacement between the driving and driven elements, wherein at least one of the driving and driven elements, which is capable of undergoing an angular displacement relative to the other element modifying the operating angle of the joint, is connected to a fixed member through a resiliently yieldable articulation which is roughly centered on the centre of the double joint and has considerable tangential flexibility and a considerable axial rigidity.

According to other features:

the resiliently yieldable articulation is of the type comprising two roughly parallel plates between which is disposed a mass of rubber or elastomeric material whose thickness (axial dimension) is small relative to its other two dimensions;

the resiliently yieldable articulation is of the type comprising two resiliently yieldable sheets of rubber or elastomer reinforced with textile or like material, each sheet being fixed along two of their opposed edges to two plates, one of which plates is connected to said movable element while the other is fixed to the fixed element;

the element whose displacement modifies the operating angle of the joint is connected to the resiliently yieldable articulation through an element with respect to which it is rotatively mounted.

The invention will be described in more detail hereinafter with reference to the accompanying drawings which are given solely by way of examples and in which.

Figure 1:
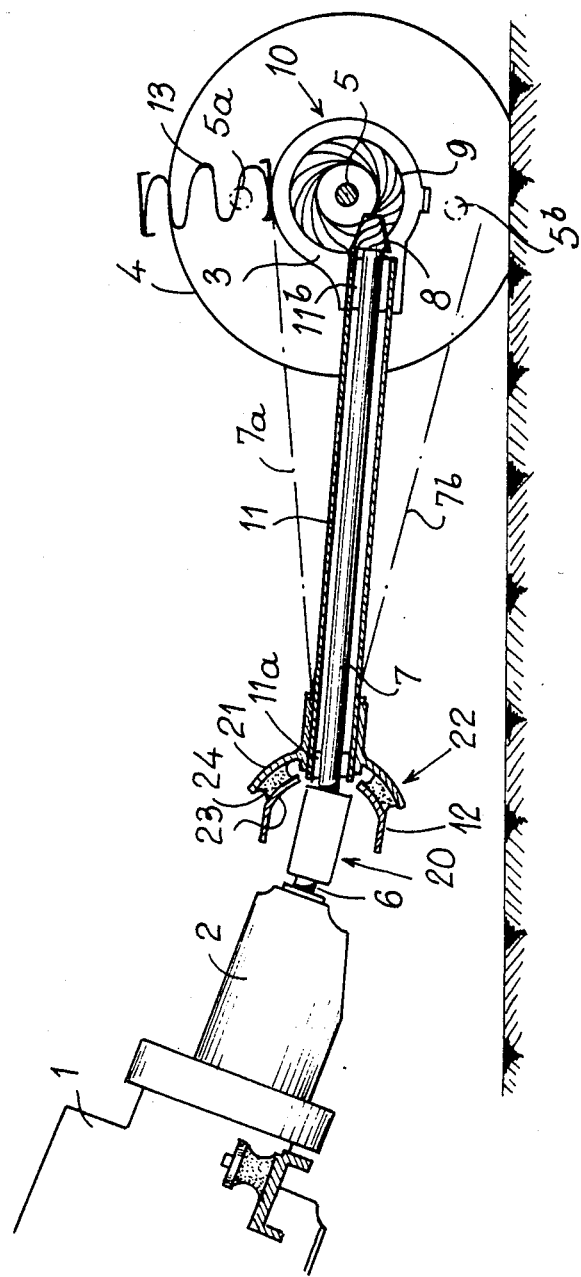
FIG. 1 is a diagrammatic longitudinal sectional view of a longitudinal transmission device according to the invention in a motor vehicle.

The longitudinal transmission device shown in FIG. 1 is interposed between a motor-propelling unit including a motor 1 and a gear box 2 and a differential 3 by which the rear driving wheels 4 are driven through transmission shafts 5.

A double joint 20, such as that for example described in the patent FR-A-78 03978 or the patent FR-A-78 12335, is interposed between a driving shaft 6 formed by the output shaft of the gear box and a driven shaft 7 formed by a longitudinal transmission shaft. The latter drives the crown gear 9 of the differential through a pinion 8.

In accordance with a known technique, the rear axle 10 formed by the differential 3 and the wheel shafts 5 is maintained by a thrust tube 11 in which the shaft 7 is mounted by means of bearings 11a, 11b. This thrust tube absorbs the tilting torque due to the pinion 8 and to the force propelling the wheels and transmits it to a cross-member 12 rigid with the body or chassis of the vehicle.

In the illustrated application, the suspension of the rear set of wheels is ensured by coil springs 13 which enable the shafts 5 to move from a mean position to end positions 5a, 5b shown in dot-dash lines in the drawing, the axis of the thrust tube and the shaft 7 then occupying positions between end positions 7a, 7b which are also shown in dot-dash lines.

Figure 2:
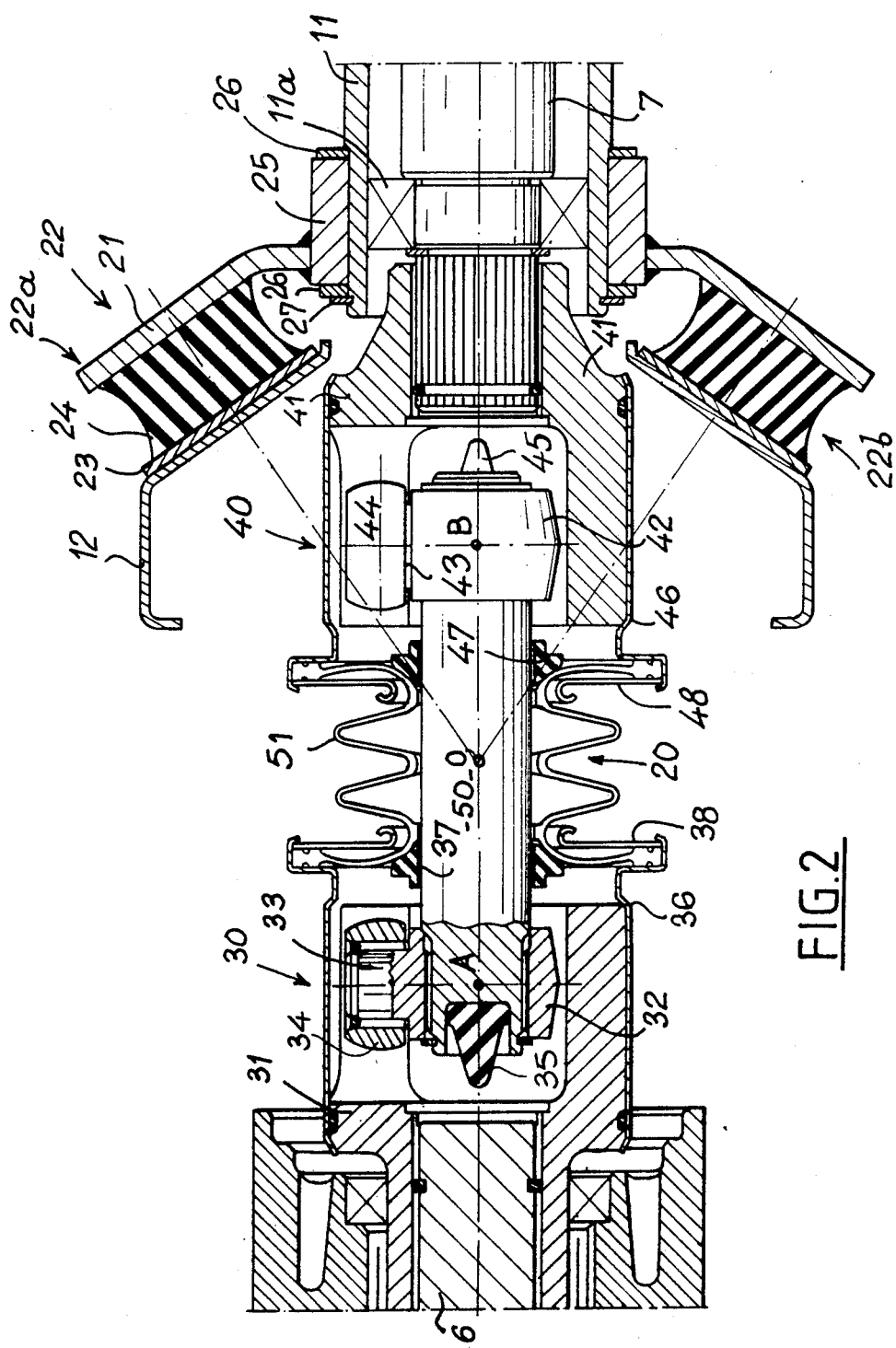
FIG. 2 is a sectional view, to an enlarged scale, of a part of such a longitudinal transmission device.
Figure 3:
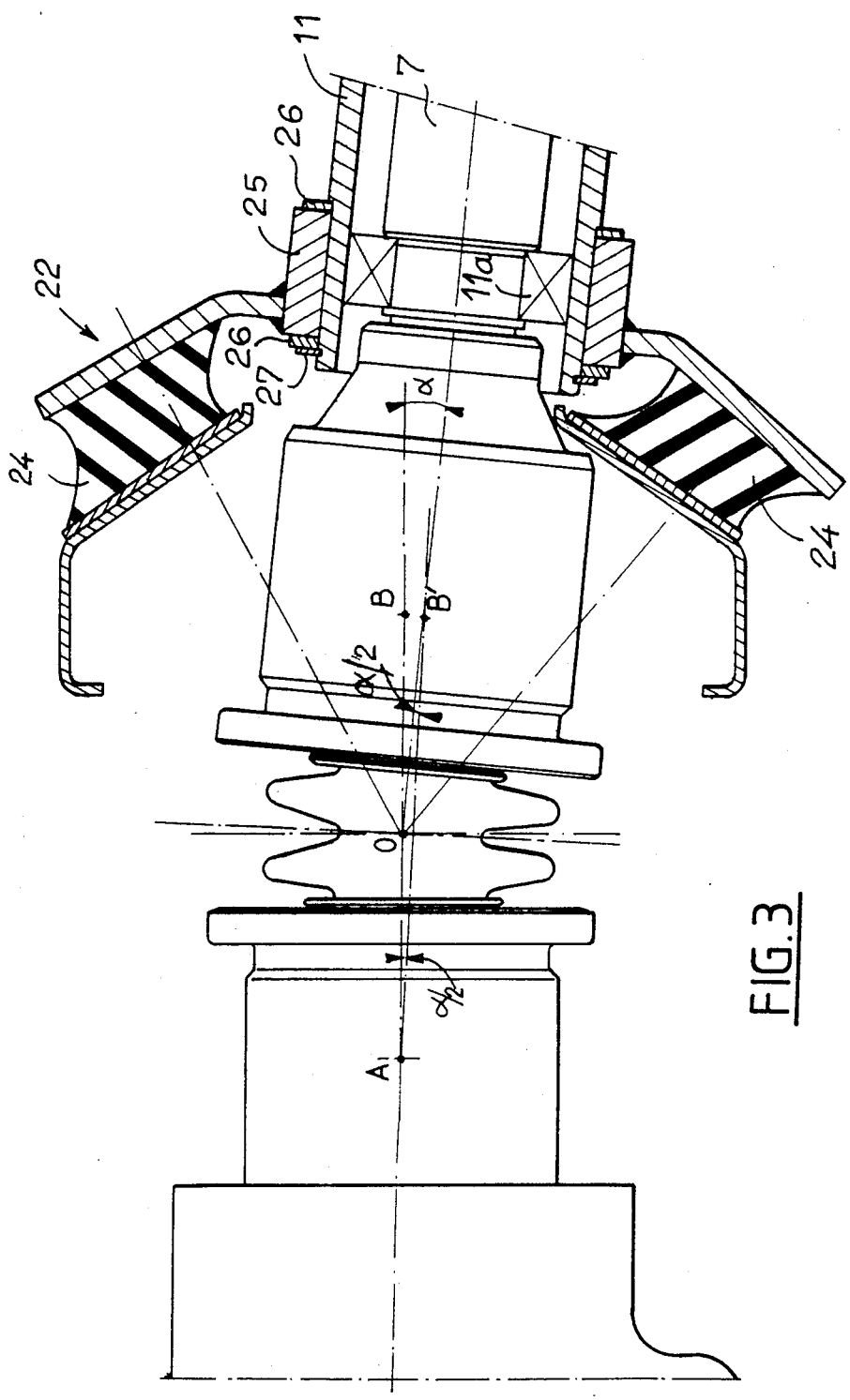
FIG. 3 is a view, partly in elevation and partly in section, of the transmission device of FIG. 2 in a different angular position.

According to the invention, the front part of the thrust tube is connected to a plate or flange 21 which is part of a resiliently yieldable articulation 22 whose other plate 23 is connected to the cross-member 12, a mass 24 of rubber or an elastomer being disposed between these two plates. The plates may have a cylindrical shape, as shown in FIG. 1, the axis of the cylinder being coincident with the centre O of the double joint and the generatrices of the cylinder being perpendicular to the plane of the FIGS. 1 and 2, i.e. perpendicular to the plane containing the axes of the shafts 6 and 7. These plates may also be spherical, frustoconical or planar as shown in FIGS. 2 and 3. In the last two cases, the lines normal to the plane of the plates passing through the centre of these plates converge at the centre of the double joint.

In fact, there may be provided two resiliently yieldable articulations which are symmetrical relative to a horizontal plane containing the axis of the shaft 7, when the latter occupies its mean position.

Regardless of the shape of these plates, the thickness of the mass of rubber or elastomer 24 interposed between the two plates is much less than its other two dimensions so as to impart to the resiliently yieldable articulation formed a high tangential flexibility and a relatively high axial rigidity. By way of example, this thickness may be on the order of 10 mm for a length and a width equal to at least 40 mm.

A device according to the invention is shown in more detail in FIG. 2 in an aligned position of the shafts 6 and 7. The double joint 20 is here formed by two tripod joints 30, 40 whose tulip elements 31, 41 defining the rolling tracks are respectively rigid with the shafts 6 and 7, the tripod elements 32, 42 of these joints being disposed at the two ends of an intermediate shaft 50. These tripod elements carry on their trunnions 33, 42 rollers 34, 44 mounted on needles. Provided at the two ends of this intermediate shaft 50 are resiliently yieldable abutments 35, 45 which axially retain the moving part constituted by the intermediate shaft and the two tripod elements. The double joint is completed by a sealing bellows 51 which is mounted between two protective cases 36, 46 and which may moreover cooperate with two spherical abutments 37, 47 which bear against radial flanges 38, 48 fixed to the ends of the protective cases through the medium of the bellows.

In the drawing, A and B designate the centres of the two tripod joints and O the centre of the double joint.

The device is completed by the resiliently yieldable articulation 22 already mentioned with reference to FIG. 1 and comprising two plates 21, 23, the plate 21 being carried by a hub 25 with respect to which the thrust tube is advantageously rotatively mounted. Sliding rings 26 and a split ring 27 or any other like means retain the tube 11 as concerns compressive and tensile forces. The second plate 23 is, as before, connected to the cross-member 12 connected to the structure of the vehicle. In the embodiment shown in FIG. 2, the resiliently yieldable articulation comprises two sub-assemblies 22a, 22b disposed symmetrically relative to the aligned axes of the shaft and intermediate shaft, each sub-assembly having a generally parallelepiped shape. The plates therefore have a planar shape and are arranged in such manner that the perpendicular struck from their centre passes through the point O, which is the centre of the double joint, or at a short distance from this point.

Owing to the arrangement shown in FIGS. 1 and 2, when the rear set of wheels undergoes a vertical displacement under the effect of unevenness of the road, the various elements assume the position shown by way of example in FIG. 3, the axis of the shaft 7 making an angle $\alpha$ relative to its original position or relative to the axis of the shaft 6. Owing to the presence of the resiliently yieldable articulation 22, the longitudinal shaft 7 moves practically about the point O, the rubber blocks 24 are deformed tangentially relative to their support surfaces substantially without changing their thickness. The centre of the joint 40 assumes the position B', the intermediate shaft 50 then assumes a position in which it makes an angle $\alpha/2$ with the shaft 6 of the gear box and with the longitudinal shaft 7 so that there is ensured an equal distribution of the increase of the operating angle between the two articulations of the double joint. This permits avoiding increasing to a greater extent the operating angle of one of the tripod joints and maintaining the amplitude of the orbital motion peculiar to this type of joint at a value which is as low as possible.

Apart from this advantage, the radial displacements of the shaft 6 due to the vibrations produced by the motor, are effectively interrrupted or cut off by the double joint. Further, the vibrations of the rear axle transmitted by the thrust tube 11 are filtered by the rubber blocks of the resiliently yieldable articulation and are therefore not transmitted to the cross-member and the chassis.

Figure 4:
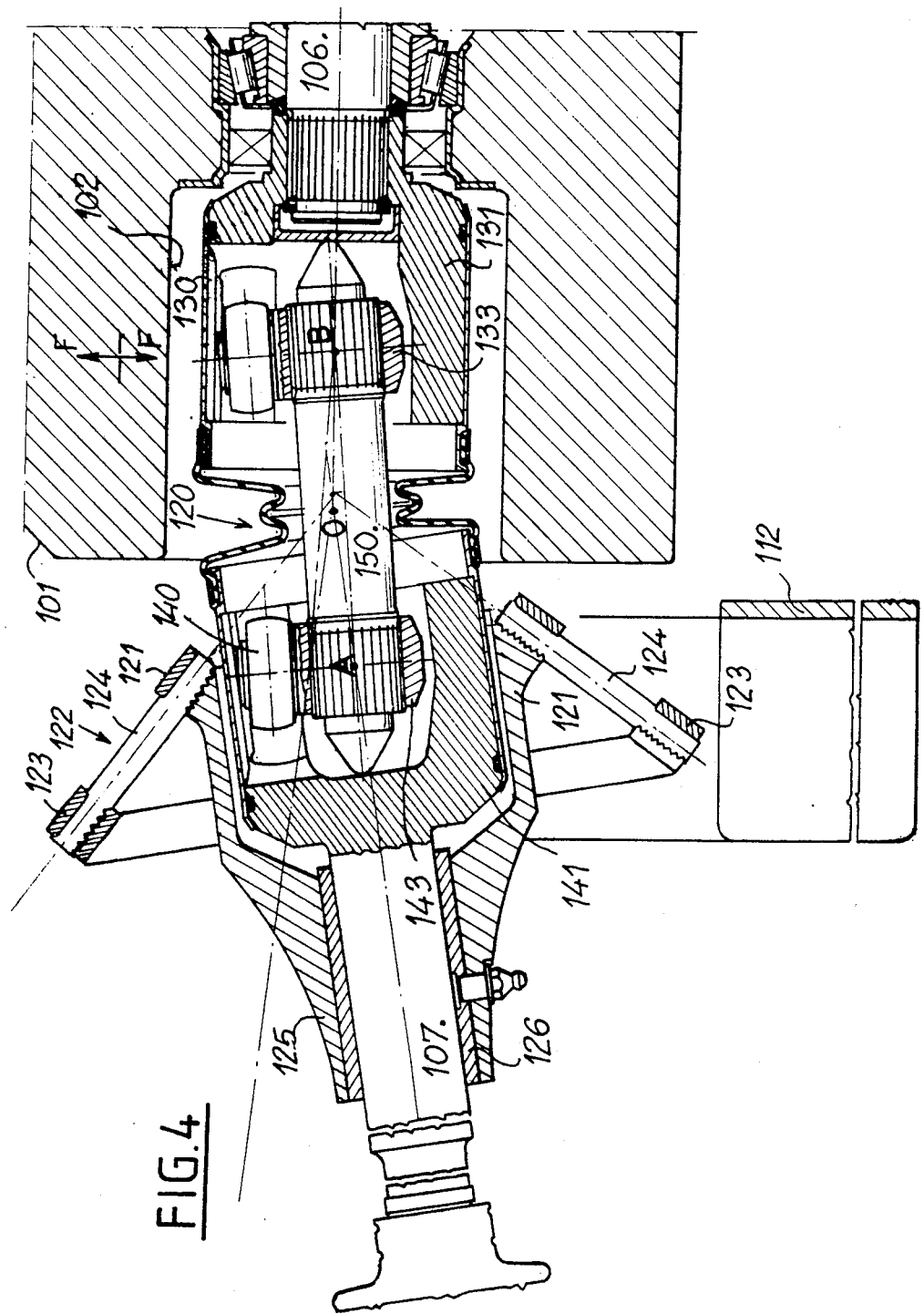
FIG. 4 is a longitudinal sectional view of a modification representing a transverse transmission device in a motor vehicle.

In the modification shown in FIG. 4, the invention is applied to a lateral transmission of a front-wheel drive automobile. A double joint 120 is interposed between an output shaft 106 of a motor-propelling unit 101 including a motor, a gear box and a differential, and a wheel shaft 107 connected to the wheel through a constant-speed joint, for example a tripod joint (not shown). The double joint is partly received in a tunnel 102 defined by the wall of the motor case and subjected to transverse vibrations represented by the arrows F. This joint comprises two constant-speed joints 130, 140, the tripod elements 133, 143 of which are connected through an intermediate shaft 150 while the tulip elements 131, 141 of these two joints are respectively connected to the shafts 106 and 107.

A resiliently yieldable connecting device 122 is interposed between the shaft 107 and an element 112 of the chassis of the vehicle. This connecting device comprises two resiliently yieldable sheets 124 of elastomer or rubber reinforced, for example, with textile, and fixed along their two opposed edges respectively to plates 121 and 123. The plate 121 is rigid with a hub 125 provided with a bearing 126 in which the shaft 107 is rotatable. The plate 123 is rigid with the structure element 112. These two resiliently yieldable sheets act as articulated links in the region of their points fastened to the support 112 and to the hub 125, the axes of these links converging at a point in the neighbourhood of the centre O of the double joint.

In this embodiment, as in the preceding embodiment, the convergence of the resiliently yieldable sheets 124 is such that the axis of the shaft 107 turns about the point O which is the centre of the double joint when the wheel moves vertically. In this way, there is achieved for each of the two articulations constituting the joint an equal and therefore minimum operating angle. Note that, in this particular case, this result is obtained notwithstanding the fact that the environment in the region of the point O is occupied by the motor case and therefore inaccessible to any support.

There has been indicated the condition imposed on the resiliently yieldable articulation 22, 122 of being "centered" on the centre O of the double joint. However, this condition may be satisfied only approximately and the "centre" of this articulation may be slightly offset relative to the point O, either by construction or in the course of use of the device under the effect of various loads to which it is subjected.

Generally, the reduction in the operating angle to the smallest materially possible value for each of the articulations permits:

1. The use of tripod articulations under the best conditions of operation of the joint of a dynamic interruption of the radial vibrations, i.e. with insignificant frictions and with a negligible amplitude of orbital motion, even at a high speed of rotation.

2. The use of universal articulations or bipod articulations in respect of which the lack of constant speed is on the whole compensated for between the input and output shafts and with a very slight lack of constant speed as concerns the intermediate shaft.

3. The use of resiliently yieldable articulations with flexible elements of metal, plastics or elastomer (if sufficient space is available), since the rotational bending stresses are thus of reduced amplitude and allow a suitable durability to be achieved.

In addition to the effective aid afforded to the interruption of the radial vibrations at a high energy coming from the motor, the device according to the invention results in or has the following further advantages:

It is simple, cheap, reliable and does not require maintenance.

It can be located outside the vicinity of the double joint when no space is available around this joint.

It cuts off or interrupts the transmission to the body of the residual vibrations coming from the rear axle or from the motor owing to the resilience and the hysteresis of the constituent resiliently yieldable elements.

What is claimed is:

1. A transmission device comprising a driving element, a driven element, a double transmission joint having two articulations and a common intermediate element interconnecting the articulations, said joint being disposed between the driving element and the driven element, one of the driving and driven elements being capable of undergoing relative to the other element an angular movement modifying the total operating angle of the joint, a fixed member, and a resiliently yieldable articulation which has an articulation centre substantially centered on the centre of the double joint and has a high tangential flexibility and a high axial rigidity connecting said element capable of undergoing angular movement relative to the other element to said fixed member.

2. A device according to claim 1, wherein the resiliently yieldably articulation comprises two roughly parallel plates between which is disposed a mass of rubber or elastomeric material whose thickness (axial dimension) is small relative to its other two dimensions, one of said plates being connected to said fixed member while the other of said plates is connected to said element capable of undergoing angular movement relative to the other element.

3. A device according to claim 1, wherein the resiliently yieldably articulation comprises two plates, two resiliently yieldable sheets of rubber or elastomer and a fabric reinforcing the rubber or elastomer, each sheet being fixed along two opposed edges to the two plates, one of which plates is connected to said element capable of undergoing angular movement while the other of said plates is connected to said fixed member.

4. A device according to claim 1, wherein the element whose movement modifies the operating angle of the joint is connected to the resiliently yieldable articulation through an element with respect to which it is rotatively mounted.

5. A device according to claim 4, wherein said fixed member is a fixed part of a vehicle, the angularly movable element modifying the operating angle of the joint is a longitudinal transmission shaft in a vehicle rotatively mounted in a thrust tube, the resiliently yieldable articulation being interposed between and interconnecting said thrust tube and said fixed part of the vehicle.

6. A device according to claim 5, wherein the resiliently yieldably articulation comprises a hub in which the thrust tube is rotatively mounted.

7. A device according to claim 4, wherein said fixed member is a fixed part of a vehicle, the element which is angularly movable and modifies the operating angle of the joint is a wheel shaft in a transverse transmission of a vehicle, which transmission includes a hub in which the wheel shaft is rotatively mounted, the resiliently yieldable articulation being interposed between and interconnecting said hub and said fixed part of the vehicle.

8. A transmission device comprising a driving element, a driven element, a double transmission joint having two articulations and a common intermediate element interconnecting the articulations, said joint being disposed between the driving element and the driven element, one of the driving and driven elements being capable of undergoing relative to the other element an angular movement modifying the total operating angle of the joint, a fixed member, and a resiliently yieldable articulation which has an articulation centre substantially centered on the centre of the double joint and has a high tangential flexibility and a high axial rigidity connecting said element capable of undergoing angular movement relative to the other element to said fixed member, said resiliently yieldable aritculation being offset relative to said articulation centre axially away from said centre of the double joint relative to said element capable of undergoing angular movement relative to the other element so as to be located substantially at an end of said double joint axially of said intermediate element.

9. A device according to claim 8, wherein said resiliently yieldable articulation comprises a resiliently yieldable member which, when viewed in section in a longitudinal axial plane containing said element capable of undergoing angular movement relative to the other element, has a substantially rectilinear median line substantially perpendicular to a line intersecting the middle of said resiliently yieldable member and substantially intersecting said centre of the double joint.

10. A device according to claim 8, wherein said resiliently yieldable articulation comprises a resiliently yieldable member which, when viewed in section in a longitudinal axial plane containing said element capable of undergoing angular movement relative to the other element, has a substantially rectilinear median line which, when prolonged, substantially intersects said centre of the double joint.

11. A device according to claim 8, wherein said resiliently yieldable articulation comprises a resiliently yieldable member which, when viewed in section in a longitudinal axial plane containing said element capable of undergoing angular movement relative to the other element, has a substantially arcuate median line having a centre of curvature substantially centered on said centre of the double joint.

* * * * *